(12) United States Patent
Nagakura et al.

(10) Patent No.: US 11,371,417 B2
(45) Date of Patent: Jun. 28, 2022

(54) INSTALLATION STRUCTURE OF HEAT ACCUMULATOR FOR VEHICLE

(71) Applicant: Honda Motor Co., Ltd., Tokyo (JP)

(72) Inventors: Masaki Nagakura, Saitama (JP); Hajime Uto, Saitama (JP); Masanobu Takazawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 52 days.

(21) Appl. No.: 17/143,168

(22) Filed: Jan. 7, 2021

(65) Prior Publication Data

US 2021/0207521 A1 Jul. 8, 2021

(30) Foreign Application Priority Data

Jan. 8, 2020 (JP) .............................. JP2020-001487

(51) Int. Cl.
*F01P 11/00* (2006.01)
*B60K 11/04* (2006.01)
*B60R 19/48* (2006.01)

(52) U.S. Cl.
CPC ............... *F01P 11/00* (2013.01); *B60K 11/04* (2013.01); *B60R 19/48* (2013.01)

(58) Field of Classification Search
CPC ......... B60K 11/04; B60K 11/08; B60R 19/48; B60R 19/44; F28D 22/00; F28D 2020/0004; Y02E 60/14; F01P 11/00; F01P 3/20; F01P 3/18; F01P 2011/205
See application file for complete search history.

(56) References Cited

U.S. PATENT DOCUMENTS

| 3,853,270 | A  | * | 12/1974 | Prebil   | B60H 1/00499 |
|-----------|----|---|---------|----------|--------------|
|           |    |   |         |          | 123/41.14    |
| 6,598,914 | B1 | * | 7/2003  | Dixon    | B60R 15/02   |
|           |    |   |         |          | 296/180.1    |
| 2010/0257890 | A1 | * | 10/2010 | Murakami | F28D 20/023 |
|           |    |   |         |          | 700/282      |
| 2011/0100021 | A1 | * | 5/2011 | Akiyama | B60H 1/00492 |
|           |    |   |         |          | 62/3.3       |

FOREIGN PATENT DOCUMENTS

JP      2013002346           1/2013
WO   WO-2020073062 A1 *     4/2020

* cited by examiner

*Primary Examiner* — Grant Moubry
(74) *Attorney, Agent, or Firm* — JCIPRNET

(57) ABSTRACT

Provided is an installation structure of a heat accumulator for a vehicle, provided on a back surface side of a bumper beam of the vehicle in the front portion of the vehicle and accumulates heat by storing a refrigerant. The bumper beam extends in the left-right direction of the vehicle and has a height dimension A in the vertical direction orthogonal to the length direction. The heat accumulator extends along the length direction of the bumper beam in a state of being close to a back surface of the bumper beam, and has a height dimension B in the vertical direction orthogonal to the length direction. The bumper beam and the heat accumulator are arranged with centers in the vertical direction coinciding with each other in the front-rear direction, and the height dimension B is set to A≤B≤1.6A with respect to the height dimension A.

8 Claims, 6 Drawing Sheets

(a)

(b)

INSTALLATION STRUCTURE OF HEAT ACCUMULATOR FOR VEHICLE

CROSS-REFERENCE TO RELATED APPLICATION

This application claims the priority benefits of Japanese application no. 2020-001487, filed on Jan. 8, 2020. The entirety of the above-mentioned patent application is hereby incorporated by reference herein and made a part of this specification.

BACKGROUND

Technical Field

The disclosure relates to an installation structure of a heat accumulator for a vehicle, which accumulates heat by storing a refrigerant for cooling the engine, battery, etc. of the vehicle.

Description of Related Art

The structure disclosed in Patent Document 1 (Japanese Laid-Open No. 2013-2346), for example, is conventionally known as an installation structure of this type of vehicle heat accumulator. The vehicle heat accumulator (hereinafter, simply referred to as "heat accumulator") has end surfaces facing each other and having a predetermined shape, and is formed in a relatively flat box shape. An inlet pipe into which cooling water flows and an outlet pipe from which cooling water flows out are disposed to protrude from one end surface of the heat accumulator, and these inlet pipe and outlet pipe are connected to a cooling circuit of the engine.

The above-described heat accumulator can be installed in various gaps in the front portion of the vehicle. The gaps include, for example, the tire house, the gap of the bumper, the inner side of the fender, and also the space around the cylindrical members such as the compressor and the motor.

Problems to be Solved

Since the above-described heat accumulator is installed in the above-mentioned various gaps, it may not be possible to increase the capacity so much, and in that case, sufficient heat accumulation cannot be performed. In addition, when the heat accumulator is installed, the flow of wind taken into the engine room from the front of the vehicle may be disturbed during the running of the vehicle. In such a case, the velocity distribution (hereinafter, referred to as "flow velocity distribution" in this specification) of the flow of wind hitting the radiator in the engine room from the front deviates, and as a result, the radiator may not be able to fully exert the function of dissipating heat from the cooling water.

SUMMARY

An exemplary embodiment of the disclosure provides an installation structure of a heat accumulator (heat accumulator 5) for a vehicle, which is provided on a back surface side of a component (bumper beam 4 in the present embodiment, the same applies hereinafter) of the vehicle in a front portion of the vehicle V and accumulates heat by storing a refrigerant. The component extends in a direction substantially orthogonal to a front-rear direction of the vehicle, and has a first width dimension A (height dimension A) in a width direction orthogonal to a length direction thereof. The heat accumulator for the vehicle extends along the length direction of the component in a state of being close to a back surface of the component, and has a second width dimension B (outer diameter B) in a width direction orthogonal to a length direction thereof. The component and the heat accumulator for the vehicle are arranged with centers in the width direction coinciding with each other in the front-rear direction, and the second width dimension B is set to $A \leq B \leq 1.6\,A$ with respect to the first width dimension A.

Figure 3:
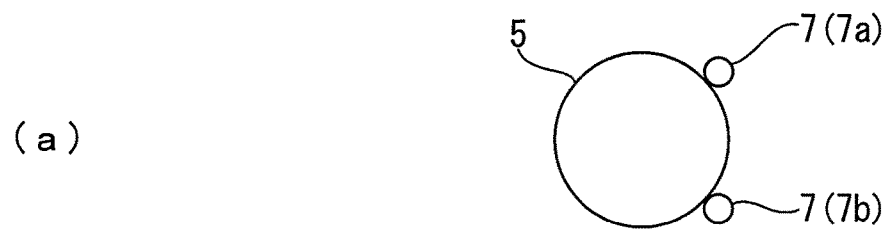
Figure 3:
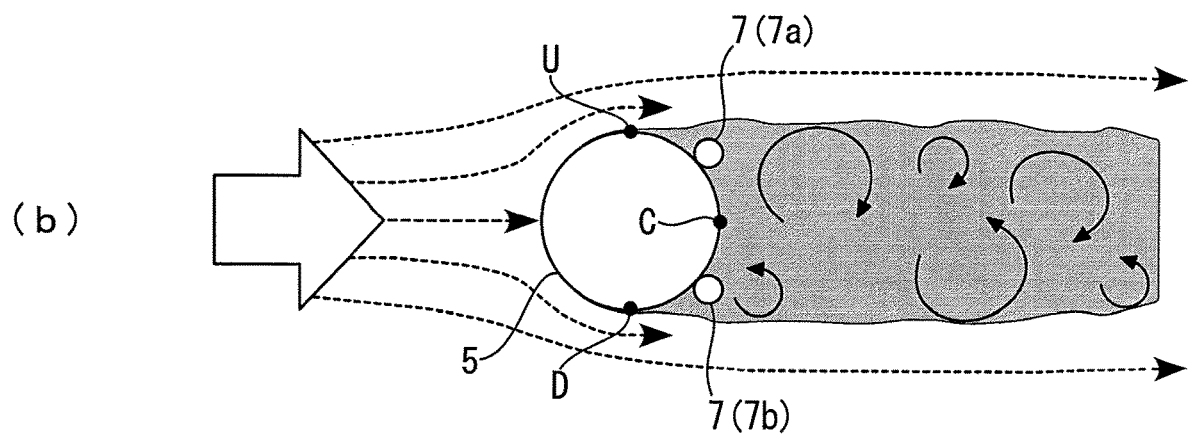

(a) of FIG. 3 is a view for illustrating a positional relationship between the heat accumulator and the cooling piping, and (b) of FIG. 3 is a view for illustrating a state when wind hits the heat accumulator from the front.

Figure 4:
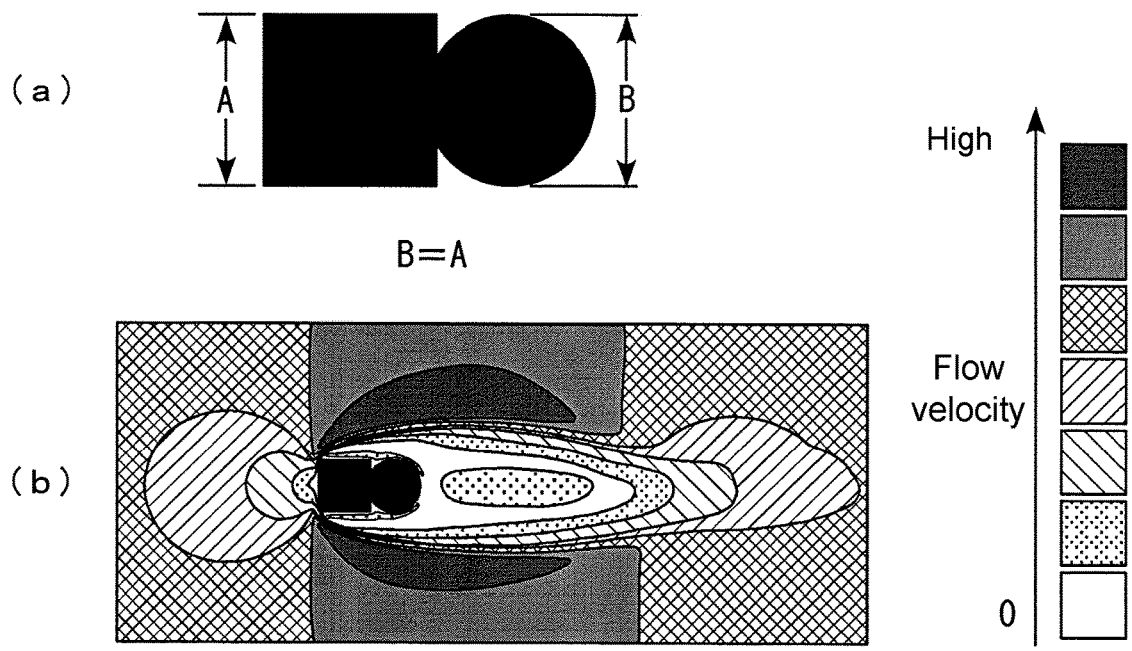

FIG. 4 includes views for illustrating a simulation of fluid analysis when the wind hits rectangular and circular cross-sectional shapes that respectively imitate a bumper beam and the heat accumulator, wherein (a) shows a relationship between the height dimensions of the rectangle and the circle (B=A), and (b) shows the simulation result.

Figure 5:
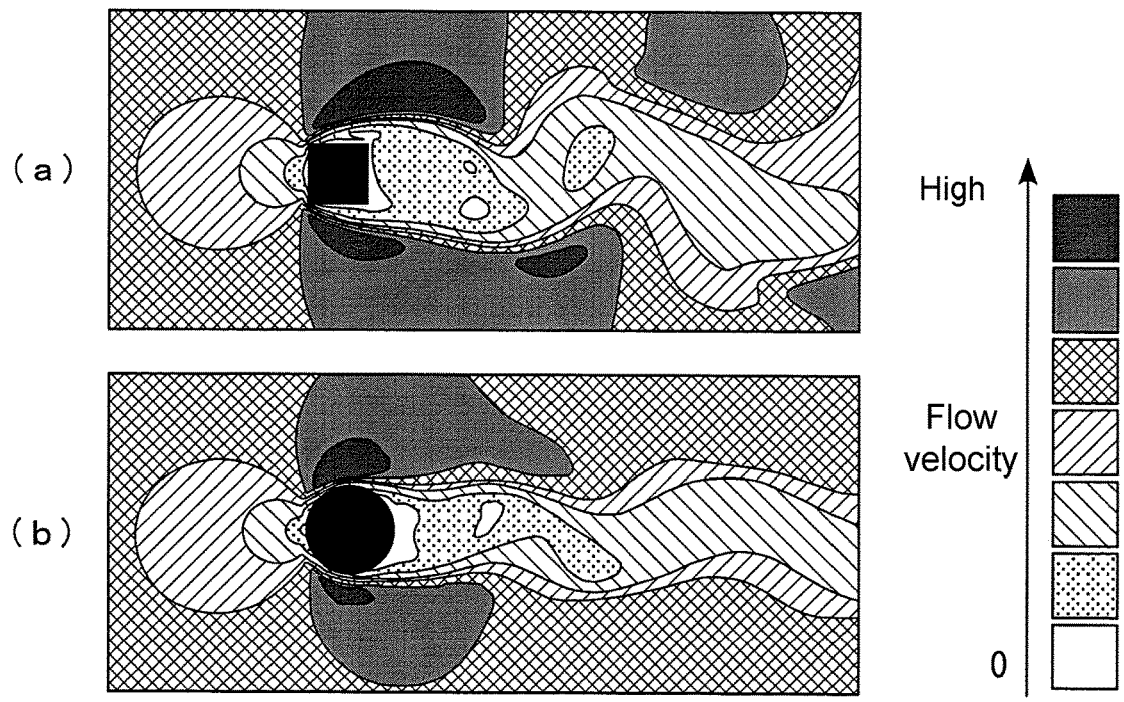

FIG. 5 includes views showing a simulation result similar to that of (b) of FIG. 4, wherein (a) shows a state when the wind hits only the rectangular cross-sectional shape that imitates the bumper beam, and (b) shows a state when the wind hits only the circular cross-sectional shape that imitates the heat accumulator.

Figure 6:
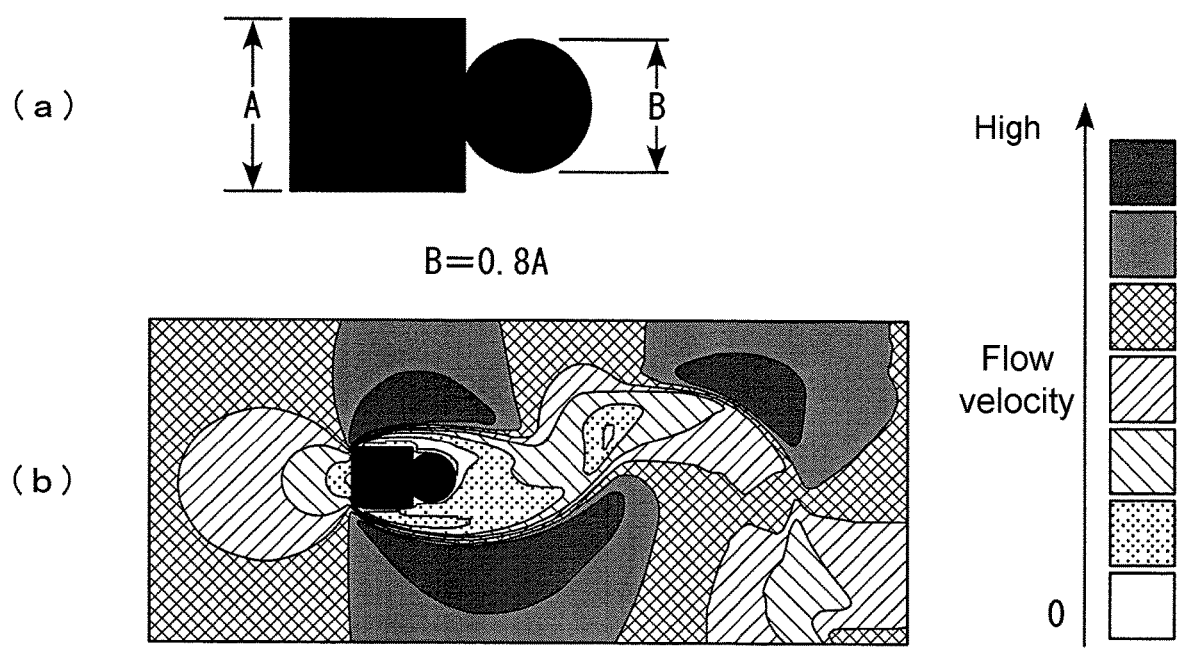

FIG. 6 includes views for illustrating a simulation similar to that of FIG. 4, and shows a state when the relationship between the height dimension B of the circle and the height dimension A of the rectangle is B=0.8 A.

Figure 7:
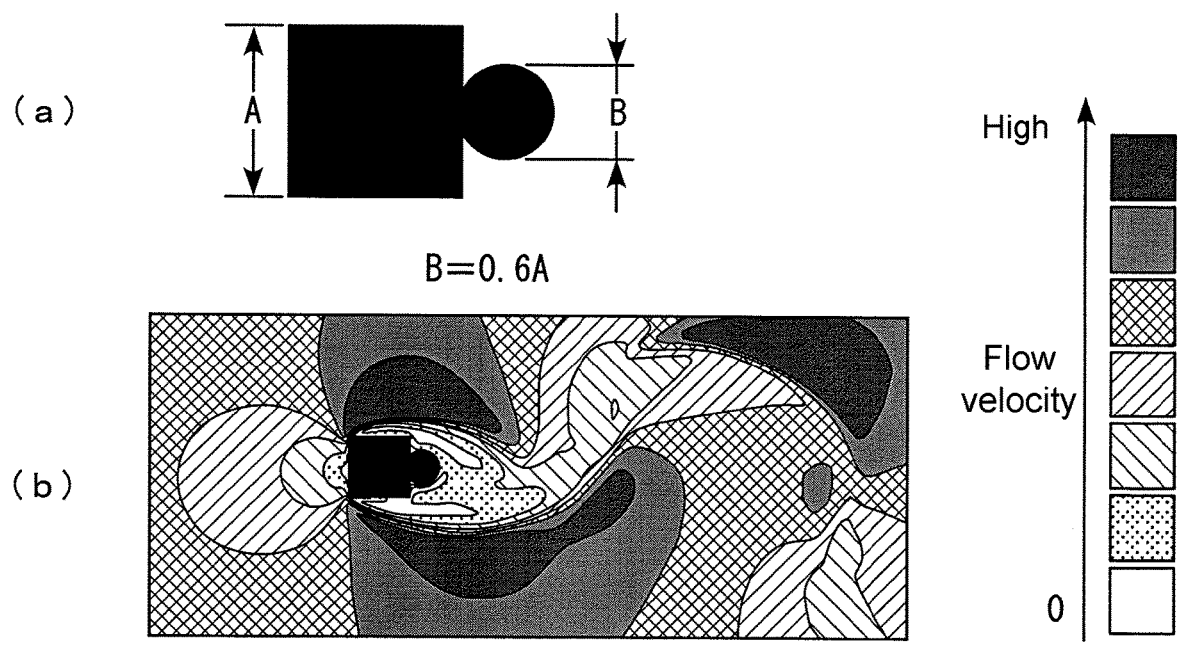

FIG. 7 includes views for illustrating a simulation similar to that of FIG. 4, and shows a state when the relationship between the height dimension B of the circle and the height dimension A of the rectangle is B=0.6 A.

Figure 8:
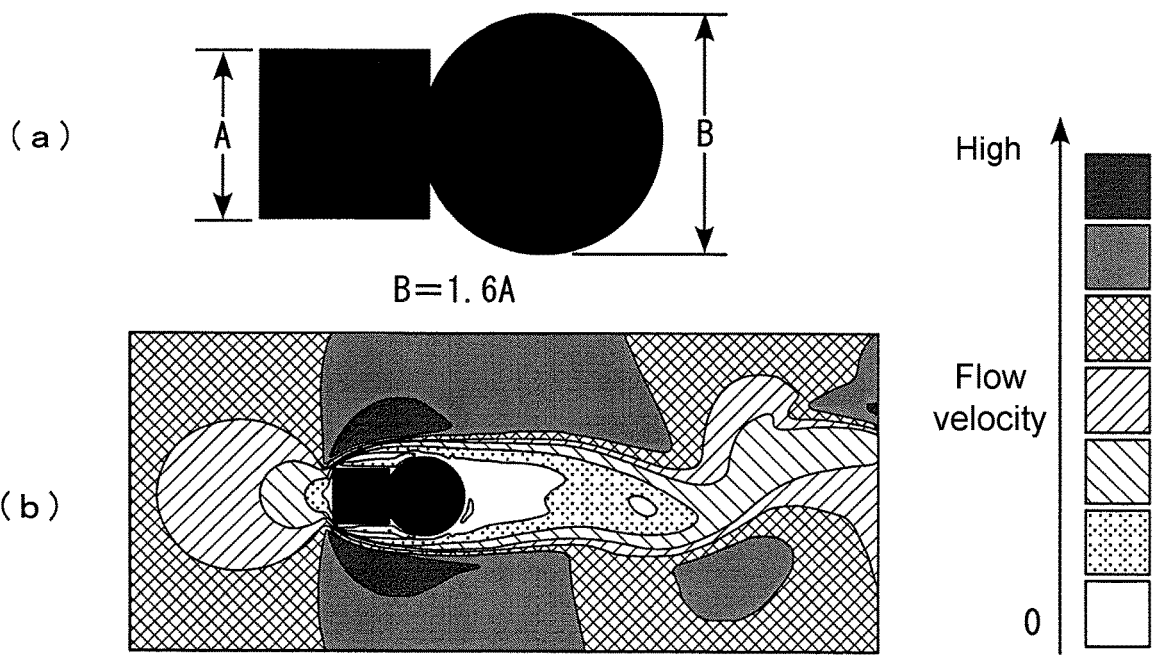

FIG. 8 includes views for illustrating a simulation similar to that of FIG. 4, and shows a state when the relationship between the height dimension B of the circle and the height dimension A of the rectangle is B=1.6 A.

Figure 9:
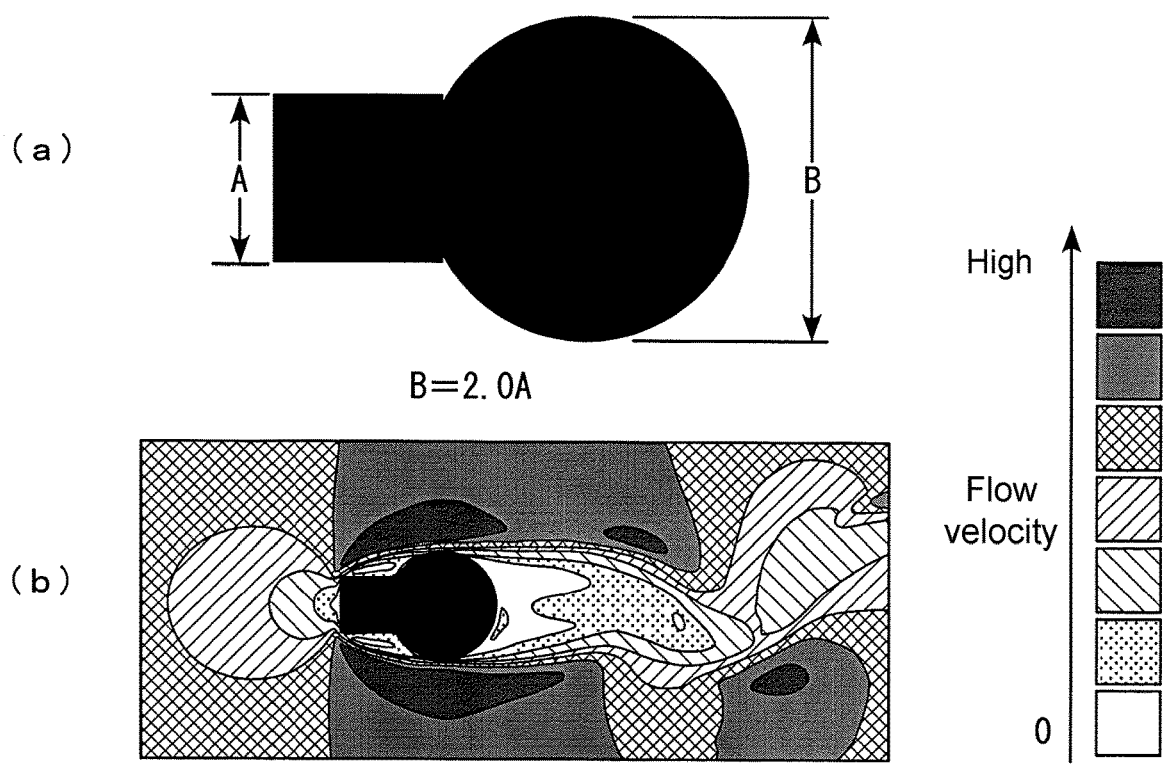

FIG. 9 includes views for illustrating a simulation similar to that of FIG. 4, and shows a state when the relationship between the height dimension B of the circle and the height dimension A of the rectangle is B=2.0 A.

Figure 10:
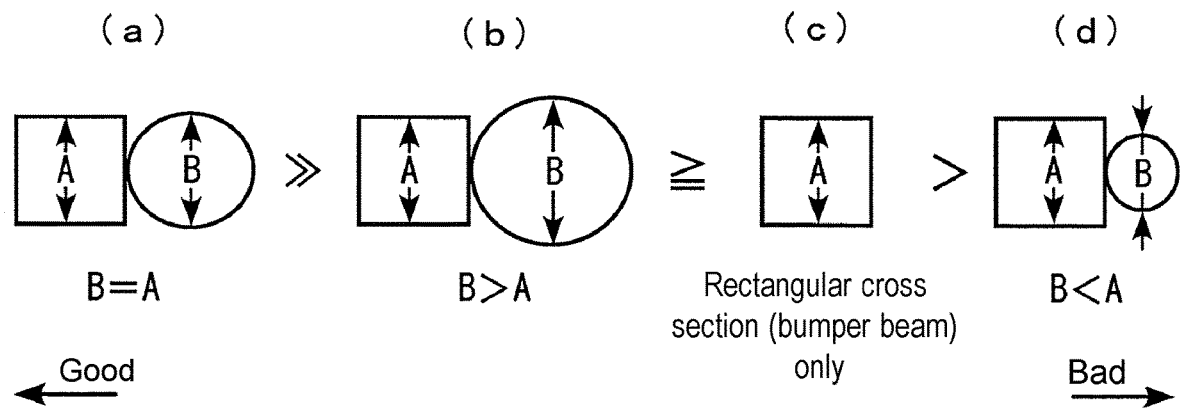

FIG. 10 includes views showing the results in order from a good type to a bad type based on the simulation results.

Figure 11:
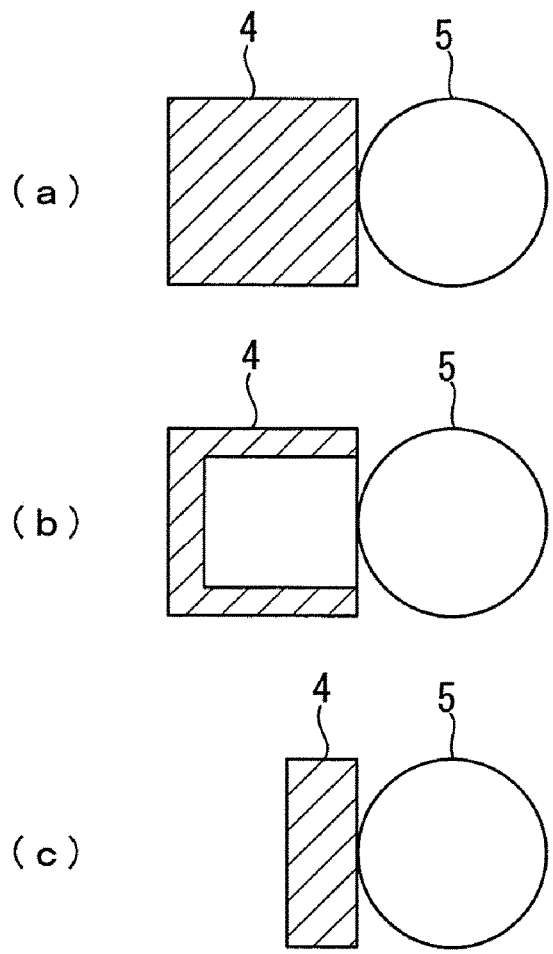

FIG. 11 includes views showing modified examples of a cross section of the bumper beam.

DESCRIPTION OF THE EMBODIMENTS

In view of the above, the disclosure provides an installation structure of a heat accumulator for a vehicle, which can effectively suppress the disturbance of the flow of wind taken into the engine room during the running of the vehicle while ensuring a relatively large capacity for storing the refrigerant.

Means for Solving the Problems

An exemplary embodiment of the disclosure provides an installation structure of a heat accumulator (heat accumulator 5) for a vehicle, which is provided on a back surface side of a component (bumper beam 4 in the present embodiment, the same applies hereinafter) of the vehicle in a front portion of the vehicle V and accumulates heat by storing a refrigerant. The component extends in a direction substantially orthogonal to a front-rear direction of the vehicle, and has a first width dimension A (height dimension A) in a width direction orthogonal to a length direction thereof. The heat accumulator for the vehicle extends along the length direction of the component in a state of being close to a back surface of the component, and has a second width dimension B (outer diameter B) in a width direction orthogonal to a length direction thereof. The component and the heat accumulator for the vehicle are arranged with centers in the width direction coinciding with each other in the front-rear direction, and the second width dimension B is set to A≤B≤1.6 A with respect to the first width dimension A.

The "substantially orthogonal" described herein includes not only an orthogonal state but also a state of being slightly inclined with respect to that state. In addition, the "state of being close to the back surface of the component" includes not only a state of being in contact with the back surface of the component but also a state where a slight gap is present with respect to the back surface (the same applies hereinafter in this specification).

According to the above configuration, in the front portion of the vehicle, the component of the vehicle extends in a direction substantially orthogonal to the front-rear direction of the vehicle, and the heat accumulator for the vehicle is arranged to extend along the length direction of the component in a state of being close to the back surface of the component. Further, the component has the first width dimension A in the width direction orthogonal to the length direction thereof, and the heat accumulator for the vehicle has the second width dimension B in the direction orthogonal to the length direction thereof. Then, the component and the heat accumulator for the vehicle are arranged so that their centers in the width direction coincide with each other in the front-rear direction, and the second width dimension B, which is the width dimension of the heat accumulator for the vehicle, is set to A≤B≤1.6 A with respect to the first width dimension A, which is the width dimension of the component.

By setting the second width dimension B of the heat accumulator for the vehicle with respect to the first width dimension A of the component as described above, it can be seen from the simulation results described later that the disturbance of the wind flow behind the heat accumulator for the vehicle is small and the wind flow is stable. That is, when the second width dimension B of the heat accumulator for the vehicle is smaller than the first width dimension A of the component (B<A), the disturbance of the wind flow behind the heat accumulator for the vehicle is large and the deviation of the flow velocity distribution is large. In addition, when the second width dimension B of the heat accumulator for the vehicle is larger than 1.6 times the first width dimension A of the component (B>1.6 A), the disturbance of the wind flow behind the heat accumulator for the vehicle and the deviation of the flow velocity distribution are generated. Therefore, by setting the second width dimension B of the heat accumulator for the vehicle to A≤B≤1.6 A with respect to the first width dimension A of the component, the disturbance of the wind flow behind the heat accumulator for the vehicle and the deviation of the flow velocity distribution can be reduced, and the wind flow can be stabilized.

According to an exemplary embodiment of the disclosure, in the installation structure of the heat accumulator for the vehicle, the component has a cross section that is formed in a rectangular shape, and the heat accumulator for the vehicle is formed in a columnar shape, and an outer diameter of the cross section is the second width dimension.

According to this configuration, the cross section of the component is formed in a rectangular shape, and the heat accumulator for the vehicle is formed in a columnar shape in which the outer diameter of the cross section is the second width dimension. By arranging the columnar heat accumulator for the vehicle on the back surface of the component having a rectangular cross section while maintaining the relationship between the first width dimension A and the second width dimension B described above, it can be seen from the simulation results described later that the disturbance of the wind flow behind the heat accumulator for the vehicle and the deviation of the flow velocity distribution are small and the wind flow is stable, compared with the case where the above-mentioned component or heat accumulator for the vehicle is arranged alone.

According to an exemplary embodiment of the disclosure, in the installation structure of the heat accumulator for the vehicle, the component is the bumper beam 4 that extends in a left-right direction of the vehicle.

According to this configuration, since the existing bumper beam can be used as the component, it is not necessary to provide a new component on the front side of the heat accumulator for the vehicle or to make a major design change for that purpose. Therefore, when the heat accumulator for the vehicle is installed in the front portion of the vehicle, it can be installed at a relatively low cost.

According to an exemplary embodiment of the disclosure, in the installation structure of the heat accumulator for the vehicle, the heat accumulator for the vehicle is arranged in front of the radiator 3 mounted in the front portion of the vehicle.

According to this configuration, since the heat accumulator for the vehicle is arranged in front of the radiator with the component arranged on the front side of the heat accumulator, the disturbance of the wind flow behind the heat accumulator for the vehicle can be reduced, and the wind flow thereof can be stabilized, which can reduce the deviation of the flow velocity distribution of the wind flow that hits the radiator from the front. As a result, the heat dissipation function of the radiator can be appropriately exerted.

Figure 1:
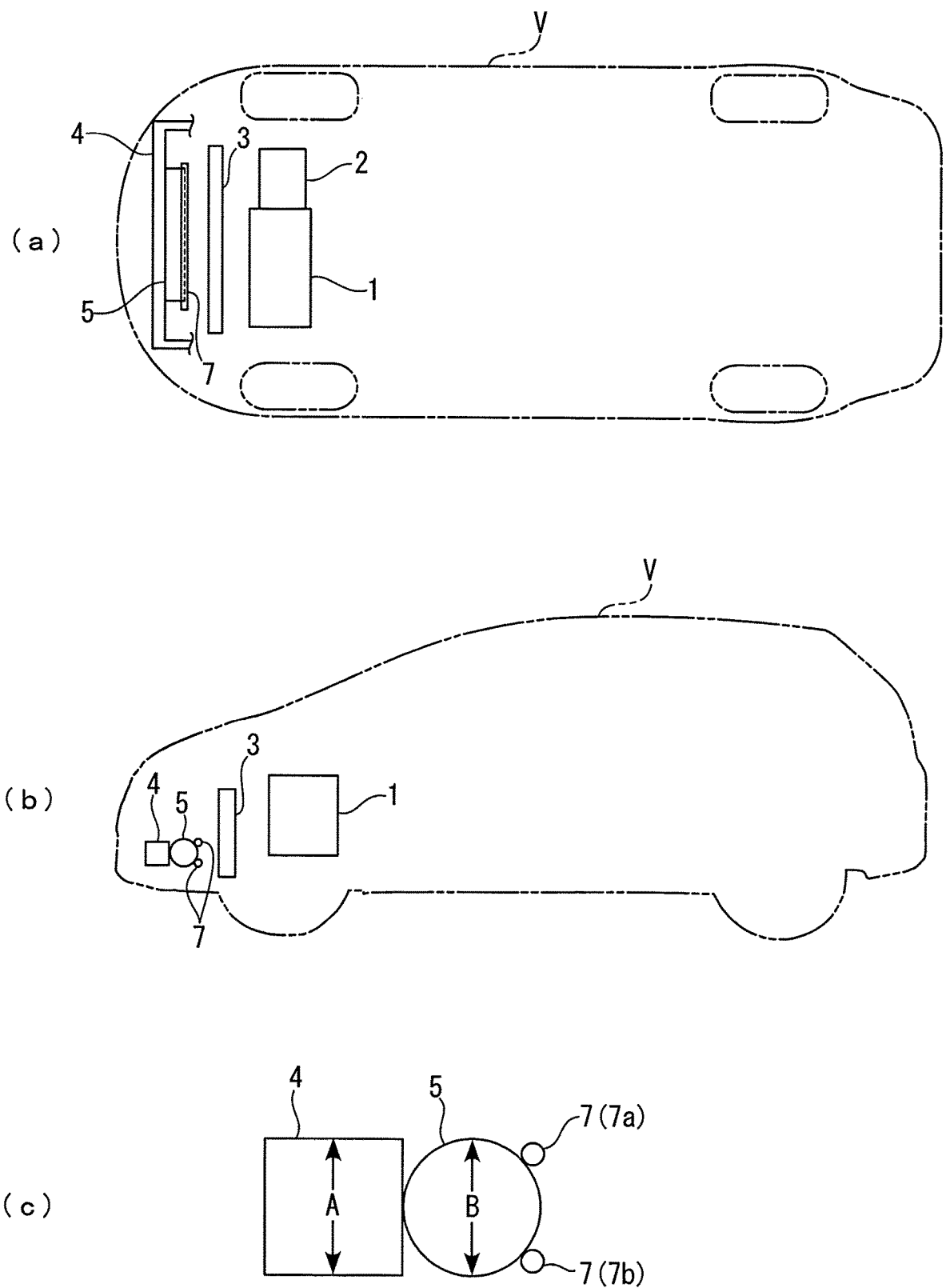
FIG. 1 schematically shows the appearance of a vehicle to which an installation structure of a heat accumulator for a vehicle according to an embodiment of the disclosure is applied, wherein (a) is a plan view, (b) is a side view, and (c) is a side view enlarging the heat accumulator and its surroundings.

Hereinafter, exemplary embodiments of the disclosure will be described in detail with reference to the drawings. (a) and (b) of FIG. 1 schematically show the appearance of a vehicle to which an installation structure of a heat accumulator for a vehicle according to an embodiment of the disclosure is applied. As shown in the figure, the vehicle V is a four-wheeled vehicle equipped with an engine 1 and a transmission 2 in the engine room at the front portion (left portion of (a) and (b) of FIG. 1). Further, in the engine room of the vehicle V, a radiator 3 that dissipates heat of a refrigerant (for example, cooling water) for cooling the engine 1, etc. is arranged in front of the engine 1. In addition, in the front portion of the vehicle V, a bumper beam 4 (component) extending in the left-right direction (vertical direction in (a) of FIG. 1) is provided in front of the radiator 3, and a heat accumulator 5 (the heat accumulator for the vehicle) is arranged on the back surface side (right side in (a) and (b) of FIG. 1) of the bumper beam 4.

The bumper beam 4 is made of a metal, a synthetic resin, etc. having high strength, and has a rectangular cross section. In addition, the bumper beam 4 has a predetermined height dimension A (first width dimension) in the vertical direction (width direction) orthogonal to the length direction thereof.

Figure 2:
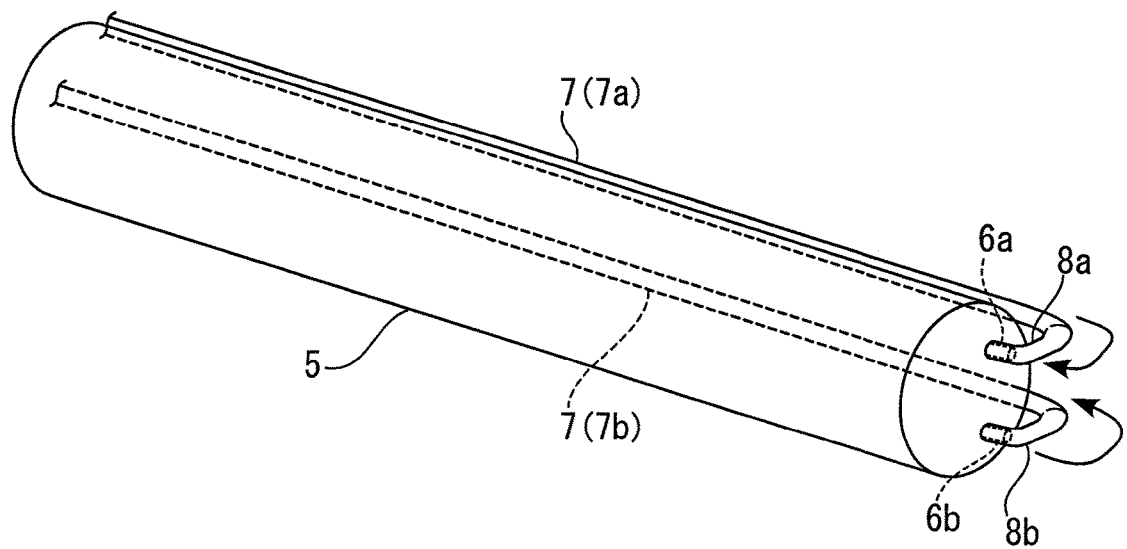
FIG. 2 is a perspective view showing the heat accumulator and the refrigerant piping connected thereto.

As shown in (c) of FIG. 1 and FIG. 2, the heat accumulator 5 is formed in a columnar shape having a predetermined outer diameter B (second width dimension) and a length, and can store a predetermined volume (for example, 4 liters) of a refrigerant inside and keep warm. Further, as shown in (a) and (b) of FIG. 1, the heat accumulator 5 extends along the length direction of the bumper beam 4, that is, the left-right direction of the vehicle V, and is arranged in a state that the center in the height direction coincides with that of the bumper beam 4 in the front-rear direction. An inflow part 6a and an outflow part 6b of the refrigerant protrude on one end surface (right side in FIG. 2) of the heat accumulator 5, and are arranged one above the other at a predetermined interval.

Furthermore, upper refrigerant piping 7 and lower refrigerant piping 7 extending along the length direction of the heat accumulator 5 are arranged on the back surface of the heat accumulator 5. Specifically, among the two sets of refrigerant piping 7, the upper one is inflow piping 7a for flowing the refrigerant into the heat accumulator 5 and the lower one is outflow piping 7b for flowing the refrigerant out of the heat accumulator 5. In addition, the above-described inflow piping 7a and outflow piping 7b are respectively connected to the inflow part 6a and the outflow part 6b of the heat accumulator 5 via predetermined connection parts 8a and 8b. Thus, as indicated by the arrow in FIG. 2, the refrigerant flowing through the inflow piping 7a turns around from the back surface side to the right end surface side of the heat accumulator 5 and flows into the heat accumulator 5. On the other hand, the refrigerant flowing out of the heat accumulator 5 turns around from the right end surface side to the back surface side of the heat accumulator 5 and flows into the outflow piping 7b.

The inflow piping 7a and the outflow piping 7b are attached in a state of being close to the back surface of the heat accumulator 5 by a predetermined mounting bracket (not shown).

Here, the layout structure of the upper and lower refrigerant piping 7 for the heat accumulator 5 will be described with reference to (a) and (b) of FIG. 3. (a) of FIG. 3 shows the outer shape of the cross section of the heat accumulator 5 and the two sets of refrigerant piping 7. As shown in (b) of FIG. 3, when wind (white arrow) from the front (left in FIG. 3) hits the heat accumulator 5, the wind flows up and down along the surface of the heat accumulator 5, as indicated by the dashed arrows, and flows away from the surface of the heat accumulator 5, that is, peels off and flows backward (right in FIG. 3) near the upper end (point U) and the lower end (point D) of the heat accumulator 5. As a result, on the back surface side (right side in FIG. 3) of the heat accumulator 5, two regions (hereinafter, referred to as "peeling regions") in which the wind flow is relatively gentle and which are connected to each other are respectively defined above the center (point C) in the vertical direction and below the upper end U of the heat accumulator 5 and below the center C and above the lower end D. Then, in these upper and lower peeling regions, the inflow piping 7a and the outflow piping 7b are respectively arranged near the upper end U and the lower end D of the heat accumulator 5.

As shown in (b) of FIG. 3, when the wind hits the heat accumulator 5 from the front and the Reynolds number is within a predetermined range, Karman vortices are generated behind the heat accumulator 5, but these vortices rarely affect the inflow piping 7a and the outflow piping 7b.

Next, a simulation (hereinafter, referred to as "wind flow simulation" where appropriate in the present embodiment) of a state when the wind hits the rectangular and circular cross-sectional shapes, respectively imitating the bumper beam 4 and the heat accumulator 5, at a predetermined flow velocity (for example, 20 to 40 km/h) from the left of each figure, which is performed on a computer using predetermined fluid analysis software, will be described with reference to FIG. 4 to FIG. 9. In FIG. 4 to FIG. 9, for convenience of illustration, the rectangular cross section corresponding to the bumper beam 4 and the circular cross section corresponding to the heat accumulator 5 are shown in black. Further, on the right side of each of FIG. 4 to FIG. 9, a legend of the simulation result (flow velocity distribution) is shown.

(a) of FIG. 4 shows a rectangular cross section corresponding to the bumper beam 4 and a circular cross section corresponding to the heat accumulator 5, and shows a state when the height dimension A of the rectangular cross section and the outer diameter, that is, the height dimension B, of the circular cross section are the same (B=A). It can be seen that, as shown in (b) of FIG. 4, when the height dimensions have the relationship (B=A) as described above, the disturbance of wind around and behind the rectangular and circular cross sections is very small, and the deviation of the flow velocity distribution is also small.

FIG. 5 shows the simulation results when the wind flow simulation is independently performed for the rectangular cross section corresponding to the bumper beam 4 and the circular cross section corresponding to the heat accumulator 5. It can be seen that, as shown in (a) and (b) of FIG. 5, when the rectangular cross section and the circular cross section receive the wind independently, the disturbance of the wind behind and the deviation of the flow velocity distribution are larger than those in the case of (b) of FIG. 4 where the rectangular cross section and the circular cross section are arranged adjacent to each other in the front-rear direction. In addition, it can be seen that when the rectangular cross section shown in (a) of FIG. 5 is compared with the circular cross section shown in (b) of FIG. 5, the disturbance of the wind and the deviation of the flow velocity distribution are larger behind the rectangular cross section than the circular cross section.

(a) of FIG. 6 shows a state when the height dimension B of the circular cross section corresponding to the heat accumulator 5 is set smaller than the height dimension A of the rectangular cross section corresponding to the bumper beam 4 (B=0.8 A). It can be seen that, as shown in (b) of FIG. 6, when the height dimensions have the relationship (B=0.8 A) as described above, behind the circular cross section, the disturbance of the wind and the deviation of the flow velocity distribution become large to the same extent as in the case of only the rectangular cross section shown in (a) of FIG. 5.

(a) of FIG. 7 shows a state when the height dimension B of the circular cross section corresponding to the heat accumulator 5 is further set smaller than the height dimension A of the rectangular cross section corresponding to the bumper beam 4 (B=0.6 A). It can be seen that, as shown in (b) of FIG. 7, when the height dimensions have the relationship (B=0.6 A) as described above, behind the circular cross section, the disturbance of the wind and the deviation of the flow velocity distribution become larger than those in the case shown in (b) of FIG. 6.

(a) of FIG. 8 shows a state when the height dimension B of the circular cross section corresponding to the heat accumulator 5 is set larger than the height dimension A of the rectangular cross section corresponding to the bumper beam 4 (B=1.6 A). It can be seen that, as shown in (b) of FIG. 8, when the height dimensions have the relationship (B=1.6 A) as described above, behind the circular cross section, the disturbance of the wind and the deviation of the flow velocity distribution are slight compared with the case of B=A shown in (b) of FIG. 4, but smaller than those in the case of only the rectangular cross section shown in (a) of FIG. 5.

(a) of FIG. 9 shows a state when the height dimension B of the circular cross section corresponding to the heat accumulator 5 is further set larger than the height dimension A of the rectangular cross section corresponding to the bumper beam 4 (B=2.0 A). It can be seen that, as shown in (b) of FIG. 9, when the height dimensions have the relationship (B=2.0 A) as described above, behind the circular cross section, the disturbance of the wind and the deviation of the flow velocity distribution are larger than those in the case shown in (b) of FIG. 8, but smaller than or equal to those in the case of only the rectangular cross section shown in (a) of FIG. 5.

FIG. 10 shows the results of a good type to a bad type in order from left to right based on the results of the above wind flow simulations. Specifically, the type shown in (a) of FIG. 10 is the best, that is, when the height dimension B of the circular cross section is the same as the height dimension A of the rectangular cross section (B=A), the disturbance of the wind and the deviation of the flow velocity distribution behind the circular cross section are very small (see FIG. 4).

Further, the type shown in (b) of FIG. 10 is relatively good, that is, when the height dimension B of the circular cross section is larger than the height dimension A of the rectangular cross section (B>A), the disturbance of the wind and the deviation of the flow velocity distribution behind the circular cross section are slight compared with the type of (a) of FIG. 10 described above (see FIG. 8). However, when the height dimension B of the circular cross section is larger than that of the type shown in (a) of FIG. 8 (see FIG. 9), the disturbance of the wind and the deviation of the flow velocity distribution behind the circular cross section are similar to those in the case of only the rectangular cross section shown in (c) of FIG. 10. Therefore, in order to suppress the disturbance of the wind and the deviation of the flow velocity distribution behind the circular cross section to obtain a relatively good result, it is preferable that the height dimension B of the circular cross section is B≤1.6 A with respect to the height dimension A of the rectangular cross section.

Furthermore, in the case of the type shown in (d) of FIG. 10, that is, when the height dimension B of the circular cross section is smaller than the height dimension A of the rectangular cross section (B<A), the disturbance of the wind and the deviation of the flow velocity distribution behind the circular cross section are larger than those in the case of only the rectangular cross section shown in (c) of FIG. 10, and the result is bad.

As described in detail above, according to the present embodiment, in the engine room in the front portion of the vehicle V, the heat accumulator 5 is arranged to extend along the length direction of the bumper beam 4 in a state of being close to the back surface of the bumper beam 4 that extends in the left-right direction. Further, the bumper beam 4 and the heat accumulator 5 are arranged so that their centers in the height direction coincide with each other in the front-rear direction, and by setting the height dimension B of the heat accumulator 5 to A≤B≤1.6 A with respect to the height dimension A of the bumper beam 4, as clearly seen from the results of the wind flow simulations described above, the disturbance of the wind flow and the deviation of the flow velocity distribution behind the heat accumulator 5 can be reduced, and the wind flow can be stabilized.

In addition, since the existing bumper beam 4 can be used as the component of the disclosure, it is not necessary to provide a new component on the front side of the heat accumulator 5 or to make a major design change to the vehicle V for that purpose. Therefore, when the heat accumulator 5 is installed in the engine room of the vehicle V, it can be installed at a relatively low cost.

Furthermore, since the heat accumulator 5 is arranged in front of the radiator 3 with the bumper beam 4 arranged on the front side of the heat accumulator 5, the disturbance of the wind flow behind the heat accumulator 5 can be reduced, the wind flow can be stabilized, and the deviation of the flow velocity distribution of the wind flow that hits the radiator 3 from the front can be reduced. As a result, the heat dissipation function of the radiator 3 can be appropriately exerted.

Nevertheless, the disclosure is not limited to the above-described embodiment and can be implemented in various forms. For example, in the embodiment, the bumper beam 4 extending in the left-right direction is used as the component of the disclosure, but the disclosure is not limited thereto. The heat accumulator 5 may be arranged on the back surface side of any member that is arranged to extend substantially orthogonal to the front-rear direction of the vehicle V and has a length similar to that of the heat accumulator 5. For example, it is also possible to arrange the heat accumulator 5 on the back surface side of a member (for example, a core support or a bulkhead) extending in the vertical direction as the component.

Further, in the embodiment, the bumper beam 4 has, for example, a rectangular cross section that is a substantially square cross section, but the cross-sectional shape is not particularly limited. It is possible to use various cross-sectional shapes if they can reduce the disturbance of the wind and the deviation of the flow velocity distribution behind the heat accumulator 5 and stabilize the wind flow. For example, as shown in FIG. 11, in addition to a square cross section that is solid ((a) of FIG. 11), a U-shaped cross-sectional shape ((b) of FIG. 11) or a vertically long rectangular cross section ((c) of FIG. 11) may be adopted. Moreover, regardless of whether it is solid or hollow, various cross-sectional shapes, such as □ shape, Δ shape, convex shape, and I shape, can be adopted.

Further, the detailed configurations of the bumper beam 4 and the heat accumulator 5 shown in the embodiment are merely examples, and can be appropriately changed within the scope of the gist of the disclosure.

What is claimed is:

1. An installation structure of a heat accumulator for a vehicle, which is provided on a back surface side of a component of the vehicle in a front portion of the vehicle and accumulates heat by storing a refrigerant, wherein the component extends in a direction substantially orthogonal to a front-rear direction of the vehicle, and has a first width dimension A in a width direction orthogonal to a length direction thereof, the heat accumulator for the vehicle extends along the length direction of the component in a state of being close to a back surface of the component, and has a second width dimension B in a width direction orthogonal to a length direction thereof, and the component and the heat accumulator for the vehicle are arranged with centers in the width direction coinciding with each other in the front-rear direction, and the second width dimension B is set to A≤B≤1.6 A with respect to the first width dimension A.

2. The installation structure of the heat accumulator for the vehicle according to claim 1, wherein the component has a cross section that is formed in a rectangular shape, and the heat accumulator for the vehicle has an outer shape formed in a columnar shape, and an outer diameter of the cross section is the second width dimension.

3. The installation structure of the heat accumulator for the vehicle according to claim 1, wherein the component is a bumper beam that extends in a left-right direction of the vehicle.

4. The installation structure of the heat accumulator for the vehicle according to claim 2, wherein the component is a bumper beam that extends in a left-right direction of the vehicle.

5. The installation structure of the heat accumulator for the vehicle according to claim 1, wherein the heat accumulator for the vehicle is arranged in front of a radiator mounted in the front portion of the vehicle.

6. The installation structure of the heat accumulator for the vehicle according to claim 2, wherein the heat accumulator for the vehicle is arranged in front of a radiator mounted in the front portion of the vehicle.

7. The installation structure of the heat accumulator for the vehicle according to claim 3, wherein the heat accumulator for the vehicle is arranged in front of a radiator mounted in the front portion of the vehicle.

8. The installation structure of the heat accumulator for the vehicle according to claim 4, wherein the heat accumulator for the vehicle is arranged in front of a radiator mounted in the front portion of the vehicle.

* * * * *